United States Patent [19]

Morisawa et al.

[11] Patent Number: 4,699,236
[45] Date of Patent: Oct. 13, 1987

[54] FOUR WHEEL DRIVE VEHICLE SLIPPAGE CONTROL DEVICE AND METHOD LIMITING CENTER DIFFERENTIAL ACTION DURING TRANSMISSION SHIFTING

[75] Inventors: Kunio Morisawa; Yasunari Nakamura, both of Toyota, Japan

[73] Assignee: Toyota Jidosha Kabushiki Kaisha, Aichi, Japan

[21] Appl. No.: 2,266

[22] Filed: Jan. 12, 1987

[30] Foreign Application Priority Data

Jan. 20, 1986 [JP] Japan ................................ 61-009100
May 27, 1986 [JP] Japan ................................ 61-121438

[51] Int. Cl.$^4$ .......................................... B60K 17/34
[52] U.S. Cl. .................................. 180/249; 364/424.1
[58] Field of Search .............. 180/249, 250, 248, 233; 74/688; 364/424.1

[56] References Cited

U.S. PATENT DOCUMENTS 4,558,414 12/1985 Sakakiyama ..................... 180/233 X

FOREIGN PATENT DOCUMENTS 2140104 11/1984 United Kingdom ................ 180/249
2172863 10/1986 United Kingdom ................ 180/249

*Primary Examiner*—John A. Pekar
*Attorney, Agent, or Firm*—Parkhurst & Oliff

[57] ABSTRACT

In a four wheel drive power transmission system for a vehicle, a power distribution device receives power from an engine and provides rotational power to the combination of the front wheels and also to the combination of the rear wheels, and is controllable either to provide differential action between the front wheels combination and the rear wheels combination, or for this differential action to be at least partially inhibited. This slippage control device includes: a subsystem which detects occurrence of certain speed shift circumstances of the transmission mechanism; and a subsystem which controls the power distribution device to at least partly inhibit its differential function, if the speed shift circumstances detection subsystem determines that the transmission mechanism is in fact undergoing the speed shift circumstances. The method of operation of this device is also described. The control of the power distribution device may be according to elapsed time from the time point of outputting of a speed shift command signal to the transmission mechanism, and may be based upon type of speed shift, or based upon load on the vehicle engine, or based upon the manually set operating range for the transmission mechanism, if it is an automatic transmission mechanism. Typically, the speed shift circumstances are speed down shift circumstances, quite usually circumstances of speed down shift to the first speed stage of the transmission mechanism, such as may accompanying a manual change of operational range of the transmission mechanism such as from "D" range to "L" range. The inhibition of differential action may be only performed if vehicle road speed is higher than a determinate value, or vehicle turning angle is lower than a determinate value, or both. The invention is particularly useful when the power distribution device for four wheel drive is of a type which, when thus being controlled to provide differential action, distributes drive torque substantially unequally between the front wheels combination and the rear wheels combination.

26 Claims, 7 Drawing Figures

FOUR WHEEL DRIVE VEHICLE SLIPPAGE CONTROL DEVICE AND METHOD LIMITING CENTER DIFFERENTIAL ACTION DURING TRANSMISSION SHIFTING

BACKGROUND OF THE INVENTION

The present invention relates to a slippage control method and device for a four wheel drive power transmission system for a vehicle, and more particularly relates to such a slippage control method and device for such a four wheel drive power transmission system for a vehicle such as an automobile adapted for four wheel drive operation, particularly adapted to control the differential action of a differential device which is provided for distributing power between the front wheels of the vehicle and the rear wheels of the vehicle, in which the construction and operation thereof are improved so as to improve the quality of slippage control and thereby improve vehicle drivability.

The present invention has been described in Japanese Patent Application Ser. Nos. 61-009100 and 61-121438 (1986), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front-rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof. And such provision of such a central or front-rear differential device is effective for achieving this result. However, a problem that arises with such provision of such a central or front-rear differential device is that, if at any time even one only of the four vehicle wheels should break away from the road surface and should start to spin, then no drive power or at least severely reduced drive power is provided to the other three vehicle wheels. This type of problem is particularly likely to arise in the event that the road conditions are poor due to rain, snow, dust, dirt, or the like which deteriorate the coefficient of the vehicle wheels on the road surface, and thereby vehicle drivability can be severely reduced.

In order to counteract this effect, it has been practiced to provide a device to such a front-rear differential device which prevents said front-rear differential device from performing differential action, in a selective fashion. When such a center differential action inhibition means, which typically may be a hydraulic clutch or a hydraulic brake, is actuated, it causes the differential action provided by said front-rear differential device between the front vehicle wheels and the rear vehicle wheels to be prevented, and instead said front vehicle wheels, considered as a pair, are driven from the vehicle engine, and also said rear vehicle wheels, considered as a pair, are independently driven from said vehicle engine. Thereby, the problem outlined above, of loss of power to the other three vehicle wheels when one of the vehicle wheels starts to spin, is obviated. Such types of structure are disclosed, for example, in Japanese Utility Model Application Laying Open Publication Ser. No. 47-203 (1972), Japanese Patent Application Laying Open Publication Ser. No. 50-147027 (1975), and Japanese Patent Application Laying Open Publication Ser. No. 60-176827 (1985), none of which is it intended hereby to admit as prior art to the present patent application except to the extent in any case required by applicable law.

In the event that the front-rear differential device is of an unequal distribution type which distributes drive torque substantially unequally between the front vehicle wheels and the rear vehicle wheels, then, during periods in which said front-rear differential device is not being prohibited from providing its differential action by the above mentioned differential action inhibition means, the amounts of torque distributed between the front vehicle wheels and the rear vehicle wheels are different. In the case that the amount of torque distributed to the rear vehicle wheels is larger than the amount of torque distributed to the front vehicle wheels, the performance of the vehicle for starting off from rest is improved; while, in the converse case that the amount of torque distributed to the front vehicle wheels is larger than the amount of torque distributed to the rear vehicle wheels the performance of the vehicle for straight ahead driving operation, and the stability of such straight ahead driving operation, are improved.

The following type of problem, however, can tend to arise in a so called full time four wheel drive vehicle fitted with such a front-rear differential device equipped with such a differential action inhibition means. When the transmission of such a vehicle is shifted between its speed stages—either in the case that said transmission is an automatic transmission or in the case that said transmission is a manual transmission but particularly in the former case that said transmission is an automatic one—this is typically done in accordance with variation of various vehicle operational parameters such as vehicle road speed and vehicle engine load (typically throttle opening), and in particular down shifts from a higher speed stage to a lower speed stage are typically carried out during episodes of vehicle acceleration and during vehicle progress along upwardly sloping road surfaces. In these types of operational conditions, the torque transmitted by the power output shaft of the engine (typically its crank shaft) increases, and accordingly the torque transmitted by the power output shaft of the transmission is increased by an even greater degree according to the shifting of the speed stage provided by said transmission from said higher speed stage to said lower speed stage, as a result of which there is a rather high likelihood of the driving vehicle wheels slipping on the surface of the road, and there is an according danger that vehicle driving performance and vehicle drivability may be deteriorated, and further that vehicle controllability may suffer. Further, when the vehicle is equipped with a typical type of automatic transmission which has various transmission operation ranges such as "D" range, "2" range, "L" range which are manually changed between by the vehicle driver but within which selection of a speed stage is automatically performed, in the case of travel along a downwardly sloping road surface, when the vehicle driver changes the transmission operational range from the "D" range to the "2" range in order to obtain an improved engine braking effect, i.e. changes the transmission operational range from a higher driving range to a lower driving range, and when even further said vehicle driver further changes the transmission operation range down from the "2" range to the "L" range in order to obtain yet further improved engine braking effect, the transmission performs automatic downward shifts of speed stage in accordance with these manual transmission range changes. In order that an automatic downward speed stage shift prompted by such a manual transmission range change should be completed as early as possible, the speed stage shift is carried out relatively quickly, and hence the torque on the output shaft of the transmission changes relatively abruptly in accordance with this speed stage shift. As a result of this, it is particularly easily in these operational circumstances for the driving vehicle wheels to slip on the surface of the road, and there is an according danger that full braking for the vehicle, particularly engine braking, may not be available, and that the vehicle driving performance and vehicle drivability and vehicle controllability may be deteriorated.

Further, in the case that the front-rear differential device is of an unequal distribution type which distributes drive torque substantially unequally between the front vehicle wheels and the rear vehicle wheels, then—either in the case that said transmission is an automatic transmission or in the case that said transmission is a manual transmission—when a down shift of the vehicle transmission is carried out as a result of vehicle deceleration when the vehicle is turning around a curve, the following further problems can tend to occur. In the case that the amount of torque distributed to the rear vehicle wheels is larger than the amount of torque distributed to the front vehicle wheels, the cornering force provided by said rear vehicle wheels will be reduced as a result of this transmission down shift, and as a result the vehicle will have a tendency to oversteer; while, in the converse case that the amount of torque distributed to the front vehicle wheels is larger than the amount of torque distributed to the rear vehicle wheels, the cornering force provided by said front vehicle wheels will be reduced as a result of this transmission down shift, and as a result the vehicle will have a tendency to understeer. In either case, the vehicle stability, controllability, and maneuverability will be deteriorated. Further, the higher the vehicle speed becomes, the more conspicuous do these effects become.

SUMMARY OF THE INVENTION

The inventors of the present invention have considered the various problems detailed above in the aforementioned type of four wheel drive type vehicle incorporating such a four wheel drive power transmission system fitted with such a center differential action inhibition means, from the point of view of the desirability of minimizing the slippage of the vehicle by inhibiting the operation of the front-rear differential device at appropriate times, while still not performing such inhibition more than actually necessary.

Accordingly, it is the primary object of the present invention to provide an improved slippage control method for a four wheel drive type vehicle, and a corresponding device for implementing said method, of the general type described above, which avoid the problems detailed above.

It is a further object of the present invention to provide such a slippage control method and device, which do not entail inhibiting the action of the front-rear differential device longer than necessary.

It is a further object of the present invention to provide such a slippage control method and device, which do not entail releasing the inhibition of the action of the front-rear differential device earlier than appropriate.

It is a further object of the present invention to provide such a slippage control method and device, which particularly inhibit the action of the front-rear differential device in vehicle operational conditions in which vehicle wheel slippage is particularly likely to occur.

It is a further object of the present invention to provide such a slippage control method and device, which particularly improve the operational performance of the vehicle during speed stage shifts of a transmission thereof.

It is a further object of the present invention to provide such a slippage control method and device, which particularly improve the operational performance of the vehicle when such speed stage shifts of a transmission thereof are down shifts.

It is a further object of the present invention to provide such a slippage control method and device, which particularly improve the operational performance of the vehicle during speed stage shifts of an automatic type transmission thereof which are automatically provided as a result of the vehicle driver manually shifting the speed range of the transmission from a higher driving range to a lower driving range.

It is a yet further object of the present invention to provide such a slippage control method and device, which is effective when the vehicle transmission is down shifted relatively abruptly.

It is a yet further object of the present invention to provide such a slippage control method and device, which maximize vehicle braking efficiency when descending down a slope.

It is a yet further object of the present invention to provide such a slippage control method and device, which maximize vehicle engine braking effectiveness.

It is a yet further object of the present invention to provide such a slippage control method and device, which maximize vehicle controllability.

It is a yet further object of the present invention to provide such a slippage control method and device, which maximize vehicle forward running stability.

It is a yet further object of the present invention to provide such a slippage control method and device, which are particularly effective, in the case that the vehicle front-rear differential device is of an unequal distribution type which distributes drive torque substantially unequally between the front vehicle wheels and the rear vehicle wheels.

It is a yet further object of the present invention to provide such a slippage control method and device, which help to prevent vehicle understeer.

It is a yet further object of the present invention to provide such a slippage control method and device, which help to prevent vehicle oversteer.

It is a yet further object of the present invention to provide such a slippage control method and device, which maximize vehicle turning stability.

According to the most general device aspect of the present invention, these and other objects are attained by, for a four wheel drive power transmission system for a vehicle with two front wheels, two rear wheels, a transmission mechanism which has at least two speed stages, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive beind controllable either to provide differential action between said combination of said front wheels of said vehicle and said combination of said rear wheels of said vehicle, or for its said differential action to be at least partly inhibited: a slippage control device, comprising: (a) a means for detecting the occurrence of certain speed shift circumstances of said transmission mechanism; and: (b) a means for controlling said power distribution device for four wheel drive to at least partly inhibit its differential function, if said speed shift circumstances detection means determines that said transmission mechanism is undergoing said speed shift circumstances; and, according to the most general method aspect of the present invention, these and other objects are attained by, for a four wheel drive power transmission system for a vehicle with two front wheels, two rear wheels, a transmission mechanism which has at least two speed stages, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or for its said differential action to be at least partly inhibited: a slippage control method, wherein: (a) the occurrence of certain speed shift circumstances of said transmission mechanism is detected; and: (d) said power distribution device for four wheel drive is controlled to at least partly inhibit its differential function, if said speed shift circumstances detection has determined that said transmission mechanism is undergoing said speed shift circumstances.

Further, according to specializations of the present invention, the above specified and other objects may be more particularly attained by a slippage control device and method as first described above, wherein said power distribution device for four wheel drive is controlled by timing control when said transmission mechanism is undergoing said speed shift circumstances in accordance with elapsed time from the time point of outputting of a speed shift command signal to said transmission mechanism. In such a case, said power distribution device for four wheel drive may be controlled by said timing control, in accordance with the actual time required for said speed shift, based upon type of speed shift, or based upon load on said vehicle engine, or—if said transmission mechanism is an automatic type transmission mechanism which is controlled automatically according to a plurality of manually set operational ranges—based upon manually set operating range for said transmission mechanism. Typically, the speed shift circumstances will be speed down shift circumstances, quite typically circumstances of speed down shift to the first speed stage of said transmission mechanism, such as accompany a manual change of operational range of said transmission mechanism, for example from the "D" range to the "L" range. Particularly, the power distribution device for four wheel drive may be of a type which, when thus being controlled to provide differential action, distributes drive torque substantially unequally between said combination of said front wheels of said vehicle and said combination of said rear wheels of said vehicle.

The slippage control device and method of the present invention, as specified above, are effective because, during transmission speed stage shift and more particularly during transmission speed stage down shifting such as to the first speed stage, the differential action of the power distribution device for four wheel drive is inhibited or completely prevented, which puts the combination of the front wheels of the vehicle and the combination of the rear wheels of said vehicle into a directly coupled or nearly directly coupled condition. Accordingly, tire slippage on the road surface is made much more unlikely, because of the virtually equal distribution of drive torque made between said front wheels combination and said rear wheels combination. Thereby, vehicle operation performance, and particularly high acceleration performance and high engine braking performance, are much improved.

Particularly, if the vehicle is traveling around a curve when the shift of transmission speed stage occurs, in the particular case that the power distribution device for four wheel drive is of a type which when being controlled to provide differential action distributes drive torque substantially unequally between said combination of said front wheels of said vehicle and said combination of said rear wheels of said vehicle, since during transmission shifting such as down shifting the differential action provided by said power distribution device for four wheel drive is inhibited or totally prevented and thereby at such a time the distribution of drive torque between the front wheels combination and the rear wheels combination becomes virtually equal, according to the action the tendency of the vehicle to understeer or to oversteer in these operational circumstances of transmission speed change while cornering, caused as described earlier in this specification by the disparity in torque distribution between said front wheels combination and said rear wheels combination, is prevented or at least ameliorated.

Further, since there is a danger of the so called tight corner braking phenomenon and attendant impediments to vehicle operating performance occurring when cornering at relatively low vehicle operating speeds, it is desirable that the inhibition or total prevention of the differential action provided by said power distribution device for four wheel drive should be prevented at such relatively low vehicle speeds, or when the corner or curve which the vehicle is describing is relatively tight.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and flow chart steps and so on in the various figures relating to one preferred embodiment, and like parts and gaps and spaces and flow chart steps and so on in figures relating to different preferred embodiments; and:

DESCRIPTION OF THE PREFERRED EMBODIMENTS

The present invention will now be described with reference to the preferred embodiments thereof, and with reference to the figures.

OVERALL VEHICLE POWER TRAIN STRUCTURE

Figure 1:
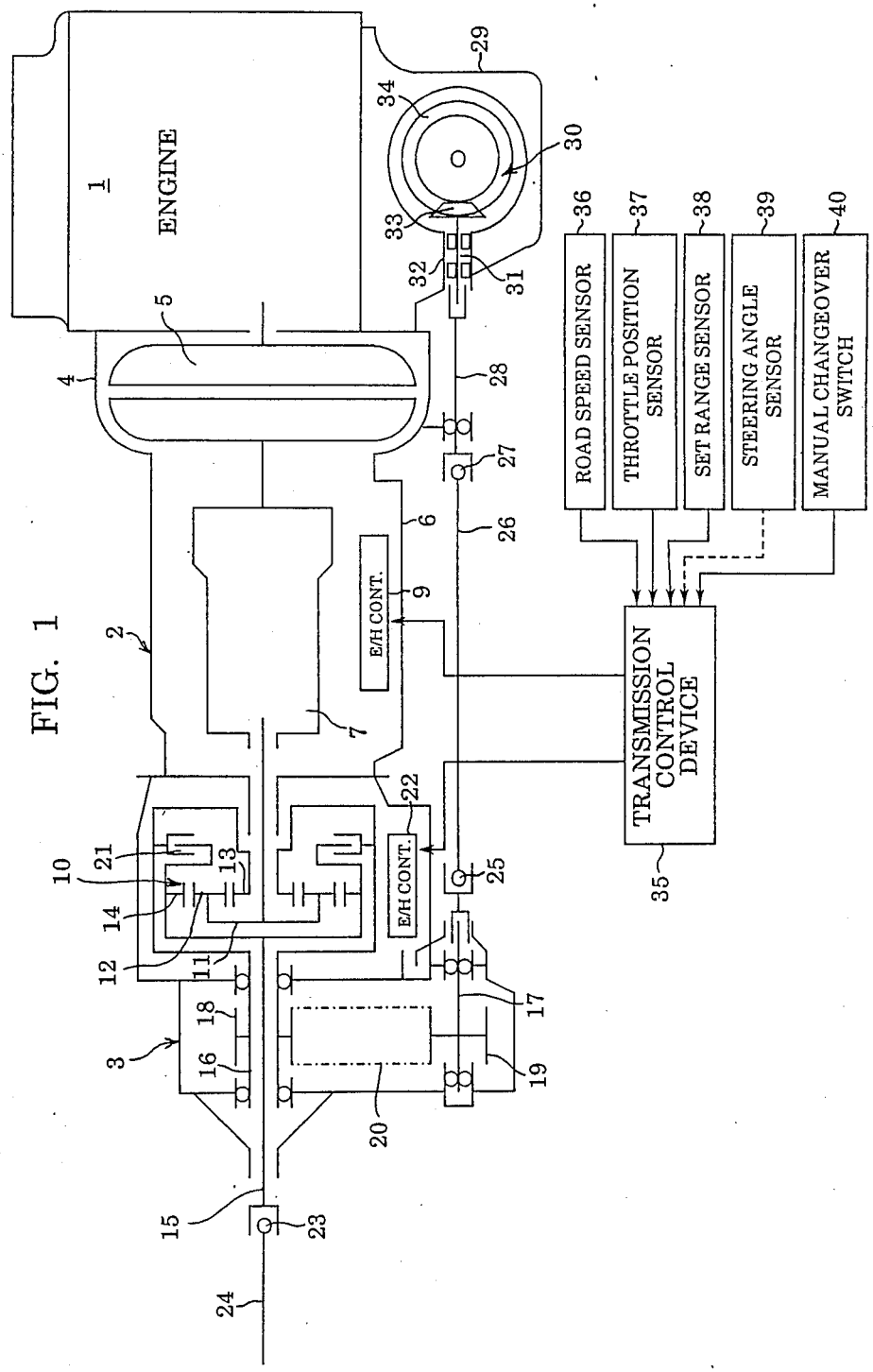
FIG. 1 is a schematic longitudinal skeleton view of a vehicle power train and of a control system therefor which incorporates any one of the preferred embodiments of the slippage control device of the present invention, for practicing the respective preferred method embodiments.

FIG. 1 is a schematic longitudinal skeleton view of a vehicle power train which incorporates any one of the preferred embodiments of the four wheel drive power transmission system slippage control device of the present invention, said device performing a corresponding method embodiment. In this figure, the reference numeral 1 denotes an internal combustion engine of said vehicle, which is mounted, in this exemplary case, longitudinally in the front engine room (not particularly shown) of said vehicle. And the reference numeral 2 denotes an automatic speed change device (automatic transmission) of a per se known type, while 3 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 3 being selectably either provided or not provided, as will be explained in detail hereinafter.

In more detail, the automatic speed change device 2 incorporates a fluid torque converter 5 of a per se known construction, and the power input shaft of this fluid torque converter 5 is connected to and receives rotational power from a crank shaft of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing fitted against and secured to the torque converter housing 4. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided by an electrically controlled electric/hydraulic control mechanism 9 of a per se known sort including various speed change solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle during the full time four wheel drive operation thereof. Now the detailed construction of this center differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this center differential device 10, and is rotationally connected to the output shaft of the gear transmission mechanism 7 via a shaft which passes through the central axis of the hollow sun gear 13. The ring gear 14 functions as one power output member for the center differential device 10 for supplying power to the rear wheels of the vehicle, and is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 16 is hollow and is fitted around the portion of the rear wheel power output shaft 15 within the housing of this four wheel drive power transfer device 3, and on its outside there is fixedly mounted a sprocket wheel 18. An endless chain 20 is fitted around this sprocket wheel 18 and another sprocket wheel 19 provided below said sprocket wheel 18, from the point of view of the figure and in the actual vehicle body also, and with its central axis parallel to the central axis of said sprocket wheel 18. The sprocket wheel 19 is fixedly mounted on a front wheel power output shaft 17, one end of which protrudes from the housing of this four wheel drive power transfer device 3 in the leftwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating, is determined by the relative tooth counts of the sun gear 13 and the ring gear 14 in the following manner:

$Rr = 1/(1 + Rg)$ $Rf = Rg(1 + Rg)$ where:
Rr is the rear wheel distribution ratio;
Rf is the front wheel distribution ratio;
and Rg is the ratio of the number of teeth on the sun gear 13 to the number of teeth on the ring gear 14.

Because the number of teeth on the sun gear 13 is naturally greater than the number of teeth on the ring gear 14, thus, providing that the number of teeth on the sprocket wheel 18 and the number of teeth on the sprocket wheel 20 are the same, this four wheel drive power transfer device 3 is of the type which distributes a larger amount of torque to the rear vehicle wheels than to the front vehicle wheels.

Further, within the four wheel drive power transfer device 3 there is provided a hydraulically operated wet type clutch 21, which selectively either rotationally connects together the sun gear 13 and the ring gear 14, or alternatively allows said members to rotate freely with respect to one another. This wet clutch 21 is selectively operated by an electrically actuated electric/hydraulic control device 22. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distributing said rotational power between said rear wheel power output shaft 15 and said front wheel power output shaft 17, or not to provide any such differential action and just to drive said shafts 15 and 17 independently.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the automatic speed change device 2 including the fluid torque converter 5 therein, roughly parallel to the longitudinal axis thereof and on one side thereof. The front end of this front wheel propeller shaft 26 is rotationally connected, via another universal joint 27 also of a per se known sort, to the outer end of a drive pinion shaft 28 which constitutes the power input shaft of a front differential device 30 which drives the front wheels (not shown) of the vehicle, and the outer end of which is supported from the torque converter casing 4 by means of a bearing assembly. And this drive pinion shaft 28 is also rotatably supported at its intermediate portion from the casing 32 of the front differential device 30 (this casing 32 is integrally formed with the oil pan 29 of the internal combustion engine 1), and the inner end of this drive pinion shaft 28 is provided with a drive pinion 33 which is constituted as a bevel gear, with said drive pinion 33 being meshingly engaged with a driven ring gear 34 of the front differential device 30.

OPERATION OF THIS POWER TRAIN

This vehicle power train operates as follows. When the clutch 21 of the four wheel drive power transfer device 3 is operated by the electrically actuated electric/hydraulic control device 22 so as not to rotationally connect together the sun gear 13 and the ring gear 14, then the center differential device 10 functions so as to provide its differential effect between the rear wheel power output shaft 15 and the intermediate front wheel drive shaft 17, i.e. so as to receive rotational power provided by the engine 1 of the vehicle and transmitted to said four wheel drive power transfer device 3 via the automatic speed change device 2, and to distribute said rotational power between the rear wheels of the vehicle taken as a combination and the front wheels of the vehicle taken as a combination. Accordingly, in this case, the power distribution (torque distribution) ratio between the front wheels of the vehicle and the rear wheels of the vehicle is determined, when the four wheel drive power transfer device 3 is operating in the above mode, by the ratio of the tooth counts of the sun gear 11 and the ring gear 12, as explained above. On the other hand, when the clutch 21 of the four wheel drive power transfer device 3 is operated by the electrically actuated electric/hydraulic control device 22 so as to rotationally connect together the sun gear 13 and the ring gear 14, then the center differential device 10 functions so as to provide no such differential effect between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 28 of the vehicle taken as a combination in an even fashion without any provision of any differential effect.

Acceleration slippage of the vehicle wheels is prevented by the connection or the shutting off of a brake hydraulic circuit, not particularly shown, according to the operation of hydraulic switchover solenoids 29a and 29b.

THE TRANSMISSION CONTROL SYSTEM

The following detectors and sensors are provided to this system. A road speed sensor 36 detects a value representative of the road speed of the vehicle by measuring the rotational speed of the rear wheel power output shaft 15, and outputs an electrical signal representative thereof. A throttle position sensor 37 detects a value representative of the current load on the internal combustion engine 1 by measuring the opening angle of the throttle valve (not particularly shown) of a carburetor (not shown either) of said engine 1, and outputs an electrical signal representative thereof. A set range sensor 38 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. A steering angle sensor 39 senses the angular position of a steering column (or of some other element) of the steering system of the vehicle, and outputs an electrical signal representative thereof. And a manual changeover switch 40 is provided in the passenger compartment of the vehicle so as to be readily accessible to the driver of the vehicle, and can typically be set to either one of two positions, one for causing the clutch 21 of the center differential device of the four wheel drive power transfer device 3 to be forcibly manually engaged so as definitely to prevent center differential action being provided thereby, and one for allowing such center differential action to be usually provided by said center differential device of said four wheel drive power transfer device 3 if not currently inhibited as described hereinafter. The output signals of these five sensors and switches 36, 37, 38, 39, and 40 are fed to a transmission control device 35.

This transmission control device 35 outputs control signals for controlling the electric/hydraulic control device 22 for the four wheel drive power transfer device 3 and the electrical/hydraulic control mechanism 9 for the gear transmission mechanism 7, as will now be explained. No concrete illustration of the structure of any particular realization of the transmission control device 35 will be given herein, since various possibilities for the details thereof can be easily supplemented by one of ordinary skill in the electronic art based upon the functional disclosures set out in this specification. In these preferred embodiments of the present invention, in each case, the transmission control device 35 is concretely realized as a micro computer and its associated circuitry, said micro computer operating at the behest of a control program, various ones of which will be partially detailed shortly. However, it should be particularly understood that such realizations in the micro computer form, although preferred, are not the only ways in which the transmission control device 35 can be provided; in other possible embodiments it could be constituted as an electrical device not incorporating a microprocessor, or indeed it could be a purely hydraulic device. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 36 through 40 to the input port device, and drive circuits through which actuating electrical signals are passed from the output port device to a speed change control solenoid or solenoids of the electrical/hydraulic control mechanism 9 for controlling the automatic speed change device 2 and to a differential device control solenoid of the electric/hydraulic control device 22 for controlling the four wheel drive power transfer device 3.

THE FIRST PREFERRED EMBODIMENTS

Figure 2:
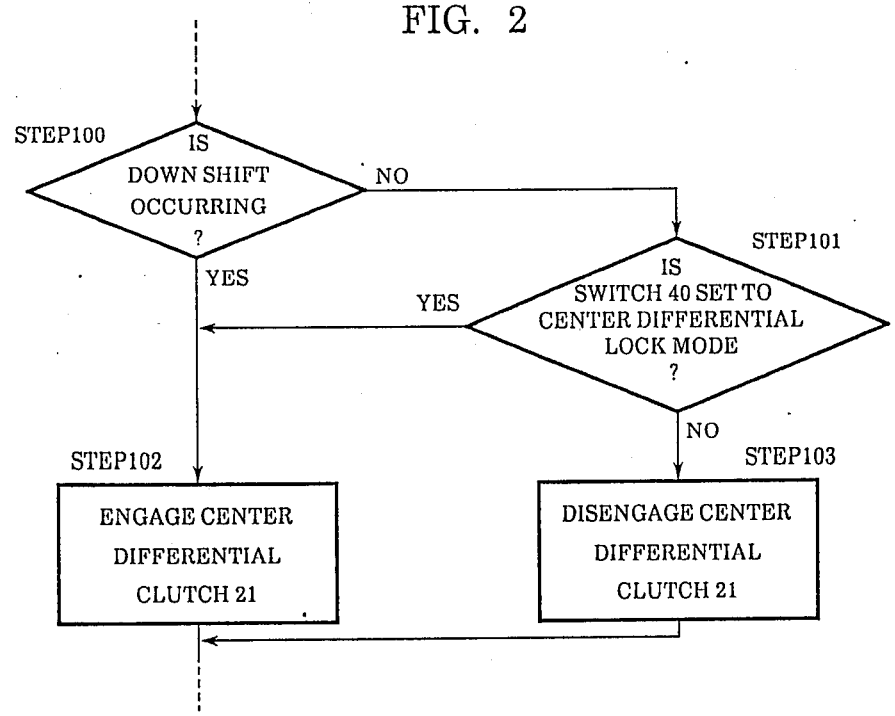
FIG. 2 is a partial flow chart for illustrating a slippage control portion of a program obeyed by a micro computer incorporated in said control system of FIG. 1, to realize the first preferred embodiments of the slippage control device and method of the present invention, said program portion being executed at regular and frequent intervals.

Now, in FIG. 2, a fragmentary flow chart is shown for a portion of the aforementioned control program which directs the operation of the transmission control device 35, according to the first preferred embodiment of the slippage control method of the present invention, so as to realize the first preferred embodiment of the slippage control device of the present invention. This flow chart will now be explained. It should be understood that the transmission control device 35 generally functions so as to engage an appropriate one of the various speed stages of the gear transmission mechanism 7 of the transmission mechanism 2 according to the current values of various vehicle operating parameters such as the vehicle road speed as sensed by the vehicle road speed sensor 36, the engine load (throttle opening) as sensed by the throttle position sensor 37, and the operating range of the transmission as manually set by the vehicle driver on the setting means therefor as sensed by the set range sensor 38; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 2 only shows the portion of the control program of the transmission control device 35 which controls the clutch 21 of the center differential device 10 of the four wheel drive power transfer device 3, i.e. only shows the slippage control routine of the transmission control device 35. This program portion is executed at regular intervals of for example a few milliseconds, of course after the engine 1 is started as the four wheel drive vehicle incorporating it is driven.

Thus, this slippage control routine, at its beginning in its first decision step 100, makes a decision as to whether or not a down shift of the gear transmission mechanism 7 is currently occurring, in this first preferred embodiment from any speed stage at all (except of course the first speed stage) to any other lower speed stage at all. If the answer to this decision is NO, so that the gear transmission mechanism 7 is in fact not currently in the process of being down shifted from any speed stage to a lower speed stage, then next the flow of control passes to the decision step 101. On the other hand, if the answer to this decision is YES, so that the gear transmission mechanism 7 is in fact currently in the process of being down shifted from some speed stage to a lower speed stage, then next the flow of control passes to the step 102.

In the decision step 101, a decision is made as to whether or not the manual changeover switch 40 is set to its position for causing the clutch 21 of the center differential device of the four wheel drive power transfer device 3 to be forcibly manually engaged so as definitely to prevent center differential action being provided thereby, or on the contrary to its position for allowing such center differential action to be usually provided by said center differential device of said four wheel drive power transfer device 3. If the result of this decision of this decision step 101 is YES, so that the manual changeover switch 40 is in fact thus set to its position for forcibly manually engaging the clutch 21 of the center differential device, then the flow of control passes next to the step 102; but if on the other hand the result of this decision is NO, so that the manual changeover switch 40 is in fact not thus set, then the flow of control passes next to the step 103.

In the step 102, the transmission control device 35 outputs a signal to the electric/hydraulic control device 22 to cause said electric/hydraulic control device 22 to engage the clutch 21 of the center differential device 10 of the four wheel drive power transfer device 3, so as definitely to rotationally couple together the sun gear 13 and the ring gear 14 of said center differential device 10, and so as therefore to positively prevent said center differential device 10 from performing its differential action between the front vehicle wheels and the rear vehicle wheels, to thus directly drive said front vehicle wheels and said rear vehicle wheels from the engine 100 without any differential action occurring therebetween; and then the flow of control passes next to exit this routine, without doing anything further. Thus, in this case, the amounts of drive torque supplied to the front vehicle wheels and to the rear vehicle wheels are substantially equal, in the case of the shown exemplary power train of FIG. 1 in which the numbers of teeth on the sprocket wheel 18 and the sprocket wheel 20 and the reduction ratios of the front and the rear differential devices and so on are such as to provide substantially the same reduction ratio between the rear wheel power output shaft 15 and the rear vehicle wheels, as between the intermediate front wheel drive shaft 16 and the front vehicle wheels.

On the other hand, in the step 103, the transmission control device 5 outputs a signal to the electric/hydraulic control device 22 to cause said electric/hydraulic control device 22 not to engage the clutch 21 of the center differential device 10 of the four wheel drive power transfer device 3, so as not to rotationally couple together the sun gear 13 and the ring gear 14 of said center differential device 10, so as therefore to allow said center differential device 10 to perform its differential action between the front vehicle wheels and the rear vehicle wheels, to thus drive said front vehicle wheels and said rear vehicle wheels from the engine 1 while distributing rotational power and torque between them with differential action; and then as before the flow of control passes next to exit this routine, without doing anything further. Thus, in this case, the amount of drive torque supplied to the front vehicle wheels is substantially less than the amount of drive torque supplied to the rear vehicle wheels, again in the case of the shown exemplary power train of FIG. 1.

And, by the repetition of the FIG. 2 program in a relatively tight and quick cycle with a period of the order of milliseconds, the control of the electric/hydraulic control device 22 of the four wheel drive power transfer device 3 is maintained.

Thus, since as described above during a down shift of the transmission mechanism 2, whether or not the manual changeover switch 40 is set by the vehicle driver for manually providing center differential locking, no differential action between the front vehicle wheels and the rear vehicle wheels is performed, and the front and the rear vehicle wheels are at this time directly coupled (as pairs) to the engine 1, since the amount of drive torque distributed to the front vehicle wheels and the rear vehicle wheels thereby becomes even, an abrupt increase in the amount of torque distributed to the rear vehicle wheels is prevented even in the event that the output torque of the transmission mechanism 2 should abruptly become greater following this down shift thereof, and accordingly in this case slippage of said rear vehicle wheels on the road surface is mitigated or prevented, and vehicle driving performance (in the event of this being an episode of vehicle acceleration) or vehicle engine braking performance (in the event of this being an episode of vehicle engine braking deceleration) are both improved. Further, vehicle controllability is enhanced. The present invention is particularly effective upon a wet or muddy or snow covered road. Further, if this down shifting of the transmission mechanism 2 should be occurring while the vehicle is going around a curve or corner, the occurrence of the over steering phenomenon, the dangers of which in this case of rear wheel drive torque normally being greater than front wheel drive torque were explained in the section of this specification entitled "Background of the Invention", is mitigated or prevented.

Thus, in this first preferred embodiment, if and when the transmission mechanism 2 is being shifted down from any speed stage to a lower speed stage (and always if the manual changeover switch 40 is set by the vehicle driver for manually providing center differential locking) the differential operation of the center differential device 10 of the four wheel drive power transfer device 3 is stopped, thus putting the transmission system of the vehicle into the direct drive condition as far as distribution of power between the front and the rear wheels thereof is concerned. After the down shift has been completed, the differential action of the center differential device 10 of the four wheel drive power transfer device 3 is restored, thus putting the transmission system of the vehicle back into the differential provision condition as far as distribution of power between the front and the rear wheels thereof is concerned. No particular driver action is required for this locking and unlocking control of the center differential device 8, which is performed automatically. Hence, slippage is restricted, and the running stability and the braking stability of the vehicle are enhanced. And also, since this slippage control method and device utilize the center differential device 8 and the clutch 19 incorporated therein which are already provided to a four wheel drive type transmission, hence the construction is relatively simple and the provision is economical.

THE SECOND PREFERRED EMBODIMENTS

Figure 3:
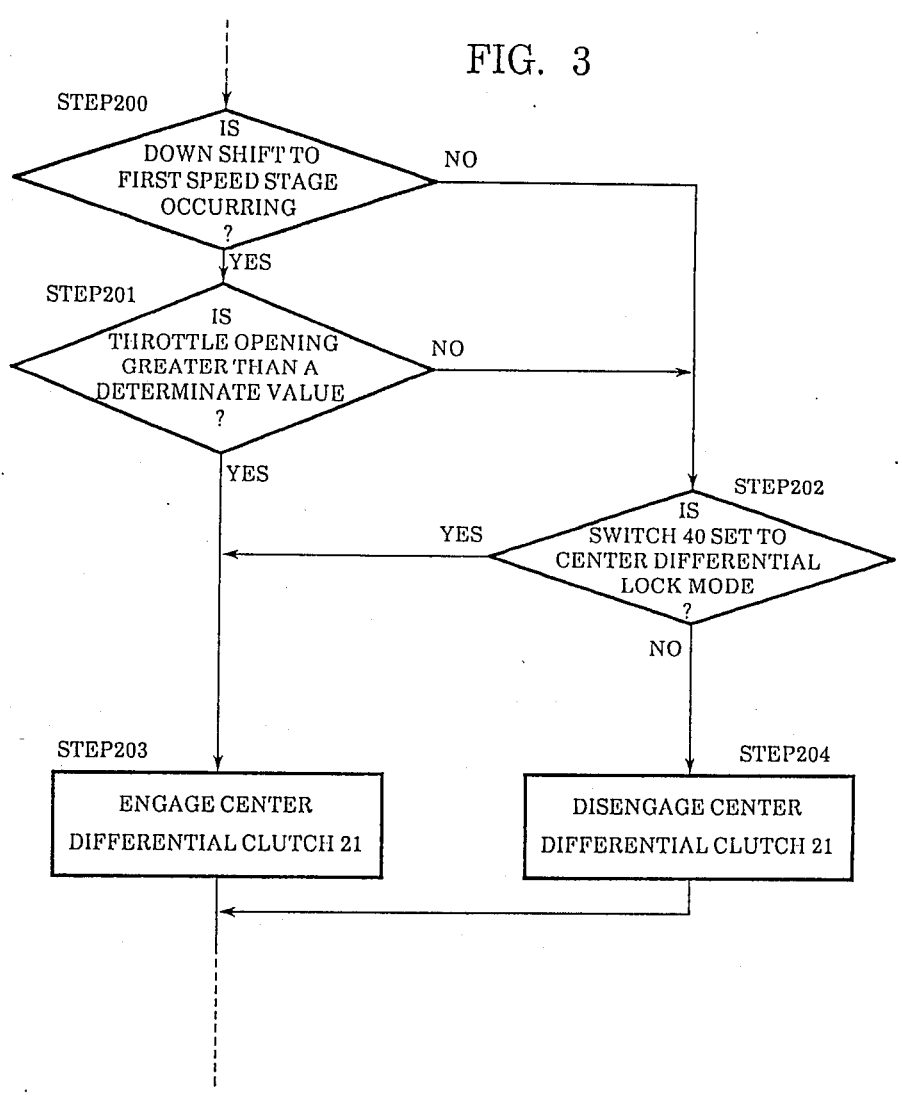
FIG. 3 is a partial flow chart, similar to FIG. 2 for the first preferred embodiments, for illustrating a slippage control portion of a program obeyed by a micro computer incorporated in said control system of FIG. 1, to realize the second preferred embodiments of the slippage control device and method of the present invention.

Now, the problem of slippage of the driving wheels of the vehicle upon the road surface due to abrupt increase in the torque being supplied to the output shaft of the transmission mechanism 2 typically occurs more during down shifts to some speed stages than during down shifts to other speed stages, so that it may well be acceptable only to inhibit the differential action of the center differential device 10 during some particular down shifts and not during others; and, further, if the throttle opening of (i.e. the load on) the engine 1 is less than a determinate value, it may well be acceptable not thus to inhibit the differential action of the center differential device 10 even during said particular down shifts, unless of course the driver has deliberately commanded such center differential device differential action inhibition. In FIG. 3, a fragmentary flow chart is shown for a portion of the control program which directs the operation of the transmission control device 35, according to the second preferred embodiment of the slippage control method of the present invention, so as to realize the second preferred embodiment of the slippage control device of the present invention, both of said second preferred embodiments implementing such ideas as described above. This flow chart will now be explained. Again, the transmission control device 35 generally functions so as to engage an appropriate one of the various speed stages of the gear transmission mechanism 7 of the transmission mechanism 2 according to the current values of various vehicle operating parameters, typically in a per se conventional way; thus, the flow chart of FIG. 3 only shows the slippage control routine for the transmission control device 35. Again, this program portion is executed at regular intervals of for example a few milliseconds.

Thus, this slippage control routine, at its beginning in its first decision step 200, makes a decision as to whether or not a down shift of the gear transmission mechanism 7, particularly now in this second preferred embodiment to the first speed stage thereof from any speed stage at all, is currently occurring. If the answer to this decision is YES, so that the gear transmission mechanism 7 is in fact currently in the process of being down shifted from some higher speed stage to its first speed stage, then next the flow of control passes to the decision step 201. On the other hand, if the answer to this decision is NO, so that the gear transmission mechanism 7 is in fact not currently in the process of being down shifted from any higher speed stage to its first speed stage, then next the flow of control passes to the decision step 202.

In the decision step 201, a decision is made as to whether or not the current value of engine throttle opening (i.e. of engine load) is greater than a determinate threshold value. If the result of this decision is YES, so that engine load is indeed greater than said determinate value, then the flow of control passes next to the step 203; but if on the other hand the result of this decision is NO, so that engine load is in fact less than said determinate value, then the flow of control passes next to the decision step 202.

In the decision step 202, a decision is made as to whether or not the manual changeover switch 40 is set to its position for causing the clutch 21 of the center differential device of the four wheel drive power transfer device 3 to be forcibly manually engaged so as definitely to prevent center differential action being provided thereby or on the contrary to its position for allowing such center differential action to be usually provided by said center differential device. If the result of this decision of this decision step 202 is YES, so that the manual changeover switch 40 is in fact thus set to its position for forcibly manually engaging the clutch 21 of the center differential device, then the flow of control passes next to the step 203; but if on the other hand the result of this decision is NO, so that the manual changeover switch 40 is in fact not thus set, then the flow of control passes next to the step 204.

In the step 203, as before, the transmission control device 35 outputs a signal to the electric/hydraulic control device 22 to cause said electric/hydraulic control device 22 to engage the clutch 21 of the center differential device 10, so as definitely to rotationally couple together the sun gear 13 and the ring gear 14 of said center differential device 10, and so as therefore to positively prevent said center differential device 10 from performing its differential action between the front vehicle wheels and the rear vehicle wheels, to thus directly drive said front vehicle wheels and said rear vehicle wheels from the engine 100 without any differential action occurring therebetween; and then the flow of control passes next to exit this routine, without doing anything further. Thus in this case as before, in this exemplary power train of FIG. 1, the amounts of drive torque supplied to the front vehicle wheels and to the rear vehicle wheels are substantially equal.

On the other hand, in the step 204, the transmission control device 35 outputs a signal to the electric/hydraulic control device 22 to cause said electric/hydraulic control device 22 not to engage the clutch 21 of the center differential device 10, so as not to rotationally couple together the sun gear 13 and the ring gear 14 of said center differential device 10, so as therefore to allow said center differential device 10 to perform its differential action between the front vehicle wheels and the rear vehicle wheels, to thus drive said front vehicle wheels and said rear vehicle wheels from the engine 1 while distributing rotational power and torque between them with differential action; and then as before the flow of control passes next to exit this routine, without doing anything further. Thus in this case as before, in this exemplary power train of FIG. 1, the amount of drive torque supplied to the front vehicle wheels is substantially less than the amount of drive torque supplied to the rear vehicle wheels.

And, as before, by the repetition of the FIG. 3 program in a relatively tight and quick cycle with a period of the order of milliseconds, the control of the electric/hydraulic control device 22 of the four wheel drive power transfer device 3 is maintained.

Thus as described above, during a down shift of the transmission mechanism 2 from any speed stage thereof to the first speed stage thereof, if and only if the current value of engine load is greater than a determinate value, and whether or not the manual changeover switch 40 is set by the vehicle driver for manually providing center differential locking, no differential action between the front vehicle wheels and the rear vehicle wheels is performed, and the front and the rear vehicle wheels are at this time directly coupled (as pairs) to the engine 1. Since the amount of drive torque distributed to the front vehicle wheels and the rear vehicle wheels thereby becomes even, an abrupt increase in the amount of torque distributed to the rear vehicle wheels, which might very likely occur in this case of down shifting to the first speed stage of the transmission mechanism 2 in these operational conditions of relatively high engine load, is prevented or mitigated, even in the event that the output torque of the transmission mechanism 2 should abruptly become greater following this down shift thereof, and accordingly in this case slippage of said rear vehicle wheels on the road surface is prevented, and vehicle driving performance (in the event of this being an episode of vehicle acceleration) or vehicle engine braking performance (in the event of this being an episode of vehicle engine braking deceleration) are both improved. Further, vehicle controllability is enhanced. Again, if this down shifting of the transmission mechanism 2 should in fact be occurring while the vehicle is going around a curve or corner, the occurrence of the over steering phenomenon is mitigated or prevented.

THE THIRD PREFERRED EMBODIMENTS

Figure 4:
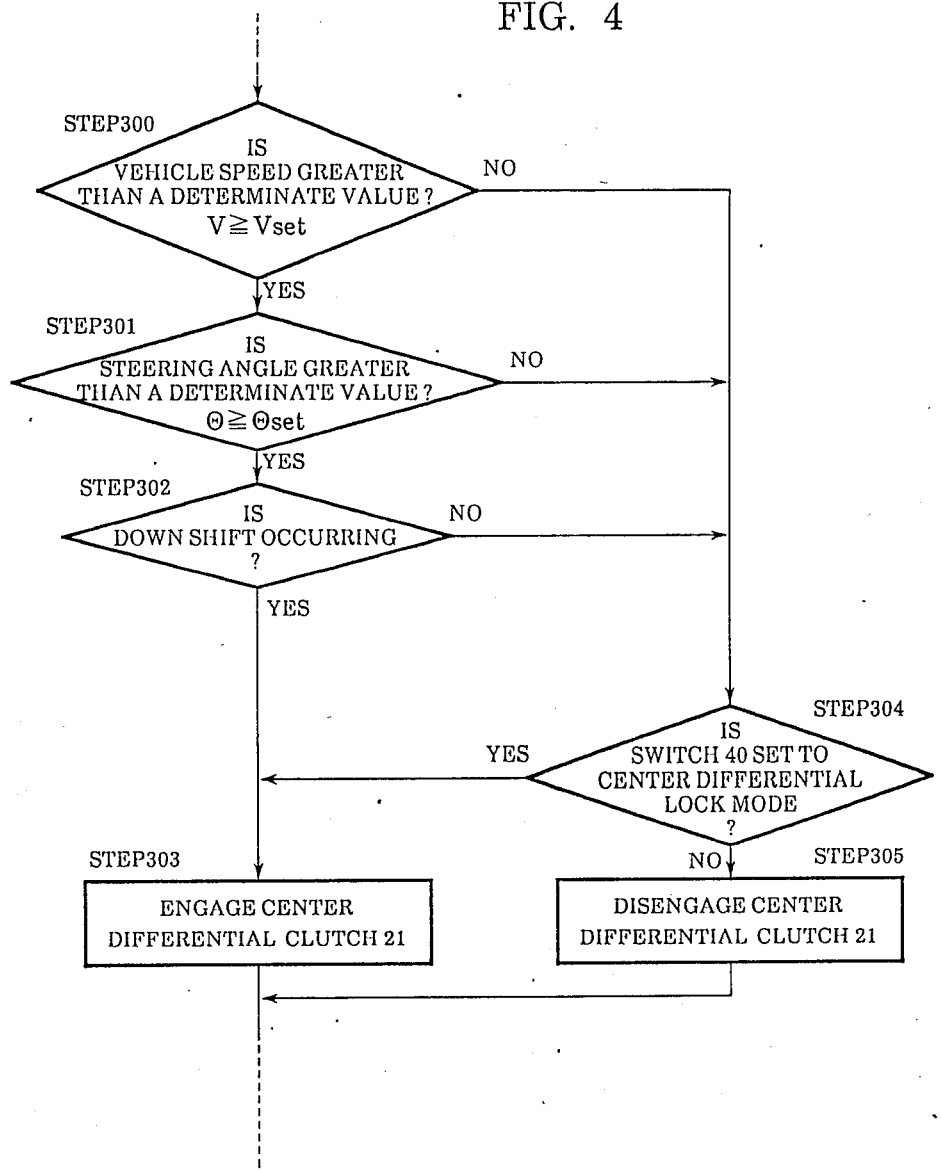
FIG. 4 is a partial flow chart, similar to FIGS. 2 and 3 for the first and second preferred embodiments respectively, for illustrating a slippage control portion of a program obeyed by a micro computer incorporated in said control system of FIG. 1, to realize the third preferred embodiments of the slippage control device and method of the present invention.

Now, the problem outlined earlier in this specification of poor vehicle cornering stability when the vehicle is going around a curve, i.e. in the case of this exemplary power train of FIG. 1 of over steering, caused by the differential operation of the center differential device 10 due to a greater torque being applied to the rear vehicle wheels than to the front vehicle wheels, typically occurs more severely when the vehicle speed is high than when it is low, and more severely when the curve which is being gone around is tight than when it is wide, so that it may well be acceptable only to inhibit the differential action of the center differential device 10 during down shifts when both the vehicle speed is higher than a certain determinate vehicle speed value and when the tightness of the curve being described is higher than a certain determinate tightness value, unless of course the driver has in any case deliberately commanded such center differential device differential action inhibition. In FIG. 4, a fragmentary flow chart is shown for a portion of the control program which directs the operation of the transmission control device 35, according to the third preferred embodiment of the slippage control method of the present invention, so as to realize the third preferred embodiment of the slippage control device of the present invention, both of said third preferred embodiments implementing such ideas as described above. This flow chart will now be explained. Again, the transmission control device 35 generally functions so as to engage an appropriate one of the various speed stages of the gear transmission mechanism 7 of the transmission mechanism 2 according to the current values of various vehicle operating parameters, typically in a per se conventional way; thus, the flow chart of FIG. 4 only shows the slippage control routine for the transmission control device 35. Again, this program portion is executed at regular intervals of for example a few milliseconds.

This slippage control routine, at its beginning in its first decision step 300, makes a decision as to whether or not the current value of vehicle road speed is greater than a determinate threshold value. If the result of this decision is YES, so that vehicle road speed is indeed greater than said determinate road speed value, then the flow of control passes next to the decision step 301; but, if on the other hand the result of this decision is NO, so that vehicle road speed is in fact less than said determinate road speed value, then the flow of control passes next to the decision step 304.

In the decision step 301, a decision is made as to whether or not the current value of steering angle is greater than a determinate threshold value. If the result of this decision is YES, so that steering angle is indeed greater than said determinate steering angle value, then the flow of control passes next to the decision step 302; but, if on the other hand the result of this decision is NO, so that steering angle is in fact less than said determinate steering angle value, then the flow of control passes next to the decision step 304.

In the decision step 302, a decision is made as to whether or not a down shift of the gear transmission mechanism 7, particularly now in this third preferred embodiment to any lower stage thereof from any higher speed stage at all thereof, is currently occurring. If the answer to this decision is YES, so that the gear transmission mechanism 7 is in fact currently in the process of being down shifted from some relatively higher speed stage to some relatively lower speed stage, then next the flow of control passes to the step 303. On the other hand, if the answer to this decision is NO, so that the gear transmission mechanism 7 is in fact not currently in the process of being down shifted from any relatively higher speed stage to any relatively lower speed stage, then next the flow of control passes to the decision step 304.

In this decision step 304, a decision is made as to whether or not the manual changeover switch 40 is set to its position for causing the clutch 21 of the center differential device 10 to be forcibly manually engaged so as definitely to prevent center differential action being provided thereby, or on the contrary to its position for allowing such center differential action to be usually provided by said center differential device 10. If the result of this decision of this decision step 202 is YES, so that the manual changeover switch 40 is in fact thus set to its position for forcibly manually engaging the clutch 21 of the center differential device, then the flow of control passes next to the step 303; but if on the other hand the result of this decision is NO, so that the manual changeover switch 40 is in fact not thus set, then the flow of control passes next to the step 305.

In the step 303, as before, the transmission control device 35 outputs a signal to the electric/hydraulic control device 22 to cause said electric/hydraulic control device 22 to engage the clutch 21 of the center differential device 10, so as definitely to rotationally couple together the sun gear 13 and the ring gear 14 of said center differential device 10, and so as therefore to positively prevent said center differential device 10 from performing its differential action between the front vehicle wheels and the rear vehicle wheels, to thus directly drive said front vehicle wheels and said rear vehicle wheels from the engine 100 without any differential action occurring therebetween; and then the flow of control passes next to exit this routine, without doing anything further. Thus in this case as before, in this exemplary power train of FIG. 1, the amounts of drive torque supplied to the front vehicle wheels and to the rear vehicle wheels are substantially equal.

On the other hand, in the step 305, the transmission control device 35 outputs a signal to the electric/hydraulic control device 22 to cause said electric/hydraulic control device 22 not to engage the clutch 21 of the center differential device 10, so as not rotationally couple together the sun gear 13 and the ring gear 14 of said center differential device 10, so as therefore to allow said center differential device 10 to perform its differential action between the front vehicle wheels and the rear vehicle wheels, to thus drive said front vehicle wheels and said rear vehicle wheels from the engine 1 while distributing rotational power and torque between them with differential action; and then as before the flow of control passes next to exit this routine, without doing anything further. Thus in this case as before, in this exemplary power train of FIG. 1, the amount of drive torque supplied to the front vehicle wheels is substantially less than the amount of drive torque supplied to the rear vehicle wheels.

And, as before, by the repetition of the FIG. 4 program in a relatively tight and quick cycle with a period of the order of milliseconds, the control of the electric/hydraulic control device 22 of the four wheel drive power transfer device 3 is maintained.

Thus as described above, in this case during a down shift of the transmission mechanism 2 from any relatively higher speed stage thereof to any relatively lower speed stage thereof, if the current value of vehicle road speed is greater than a determinate vehicle road speed value and also the current value of steering angle is greater than a determinate steering angle value, and in this case whether or not the manual changeover switch 40 is set by the vehicle driver for manually providing center differential locking, no differential action between the front vehicle wheels and the rear vehicle wheels is performed, and the front and the rear vehicle wheels are at this time directly coupled (as pairs) to the engine 1. Since the amount of drive torque distributed to the front vehicle wheels and the rear vehicle wheels thereby becomes even, the problem of vehicle over steering, which might very likely occur in this case of down shifting of the transmission mechanism 2 in these operational conditions of relatively high vehicle speed and turning angle, is prevented or mitigated, even in the event that the output torque of the transmission mechanism 2 should abruptly become greater following this down shift thereof, and accordingly in this case slippage of said rear vehicle wheels on the road surface and consequent oversteer is mitigated or prevented, and vehicle steering stability during high speed cornering is improved.

THE FOURTH PREFERRED EMBODIMENTS

Finally, fourth preferred embodiments of the device and method of the present invention will be disclosed in which the differential operation of the center differential device 10 is only inhibited in relatively narrow operational circumstances in which it is deemed that said center differential action inhibition is definitely required. These operational circumstances are: during a down shift from the fourth speed stage to the first speed stage, when either the engine throttle opening is lower than a certain first determinate throttle opening value or when said engine throttle opening is higher than a certain second determinate throttle opening value. The motivation for these concepts is as follows. The transmission mechanism 2 typically will only be subjected to such an abrupt and distant down shift from its fourth speed stage to its first speed stage, if the vehicle driver manually alters the operational range of said transmission mechanism 2 by actuation of the manual range selection means therefor from the "D" range to the "L" range; and the vehicle driver will only do this in one of two sets of circumstances: if he or she wishes to obtain sudden and high vehicle acceleration performance, or if he or she wishes to obtain high engine braking effect as when descending a steep incline. And, in either case, if the engine throttle opening is in fact intermediate between the first and the second determinate values therefor, then in any case no inhibition of the differential action of the central differential device 10 will be required, since no very great alteration of the output torque of the transmission mechanism 2 will occur as a result of this downshift from the fourth speed stage thereof to the first speed stage thereof.

Figure 5:
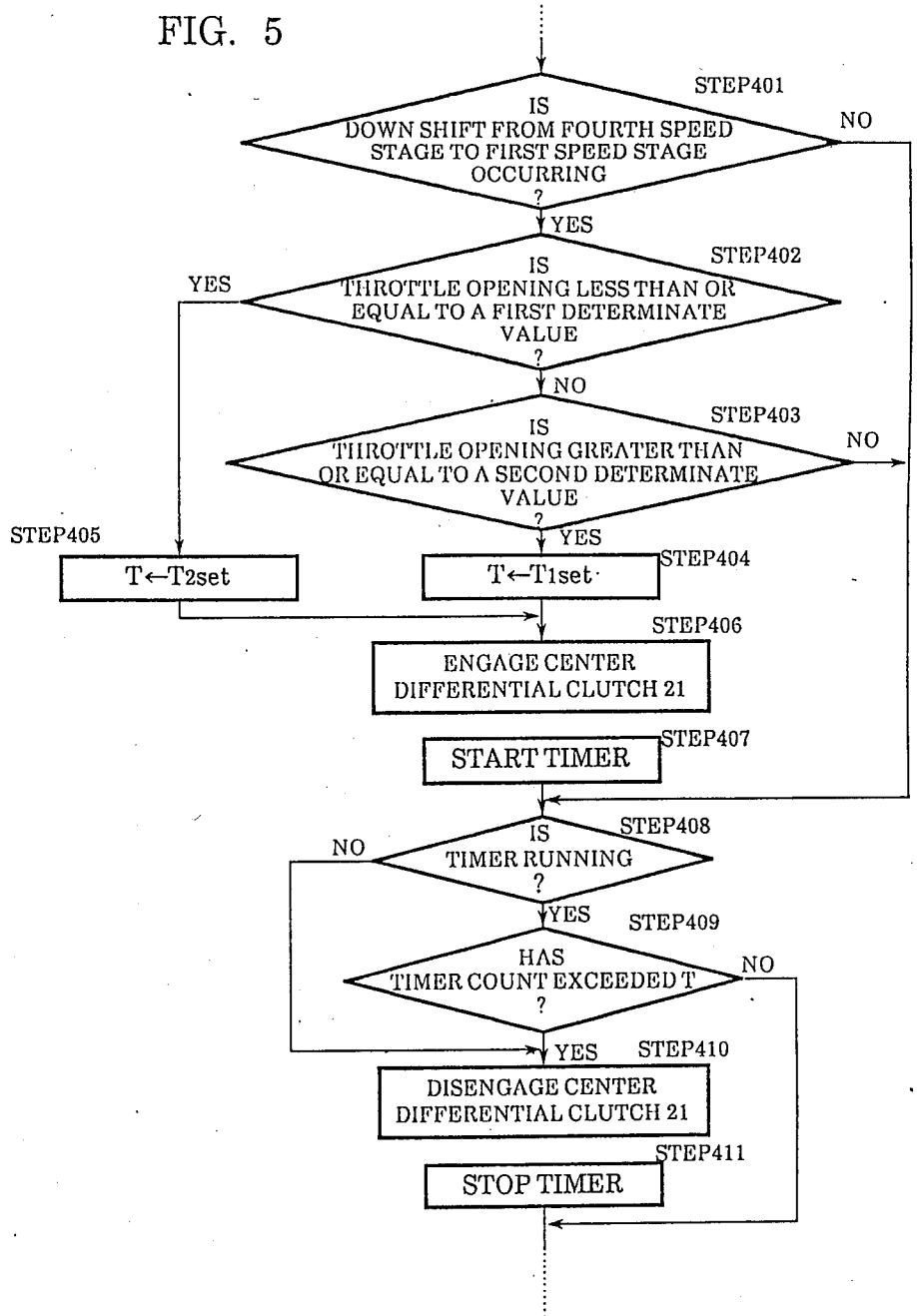
FIG. 5 is a partial flow chart, similar to FIGS. 2 through 4 for the first through the third preferred embodiments respectively, for illustrating a slippage control portion of a program obeyed by a micro computer incorporated in said control system of FIG. 1, to realize the fourth preferred embodiments of the slippage control device and method of the present invention.

In FIG. 5, therefore, a fragmentary flow chart is shown for a portion of the control program which directs the operation of the transmission control device 35, according to the fourth preferred embodiment of the slippage control method of the present invention, so as to realize the fourth preferred embodiment of the slippage control device of the present invention, both of said fourth preferred embodiments implementing such ideas as described above. This flow chart will now be explained. Again, the transmission control device 35 generally functions so as to engage an appropriate one of the various speed stages of the gear transmission mechanism 7 of the transmission mechanism 2 according to the current values of various vehicle operating parameters, typically in a per se conventional way; thus, the flow chart of FIG. 5 only shows the slippage control routine for the transmission control device 35. Again, this program portion is executed at regular intervals of for example a few milliseconds. In the present explanation, and in the FIG. 5 fragmentary flow chart, discussions and flow chart steps regarding the setting and the operation of the manual changeover switch 40 for causing the clutch 21 of the center differential device 10 to be forcibly manually either engaged or disengaged so as definitely to prevent center differential action being provided or on the contrary to allow such center differential action to be usually provided by said center differential device 10 except when inhibited by the FIG. 5 flow chart steps as will shortly be discussed, will be omitted, since from the descriptions given above in the cases of the first through the third preferred embodiments such concepts will already be well understood and have been already sufficiently and amply exemplified.

In this slippage control routine, at its beginning in its first decision step 401, a decision is made as to whether or not an order for a down shift of the gear transmission mechanism 7, particularly now in this fourth preferred embodiment to the first or lowest speed stage thereof from the fourth or highest speed stage thereof, has been outputted. If the answer to this decision is YES, so that an order for down shifting the gear transmission mechanism 7 from its highest fourth speed stage to its lowest first speed stage has been outputted, then next the flow of control passes to the decision step 402. On the other hand, if the answer to this decision is NO, so that an order for down shifting the gear transmission mechanism 7 from its highest fourth speed stage to its lowest first speed stage in fact has not been outputted, then the flow of control skips to pass next to the decision step 408. This shifting of the gear transmission mechanism 7 directly to the first or lowest speed stage thereof from the fourth or highest speed stage thereof in fact would have been commanded based upon a manual resetting by the vehicle driver of the set range control means, as detected by the set range sensor 38, from the "D" range to the "L" range, typically either for obtaining high vehicle acceleration or for obtaining high vehicle engine braking effect.

In the decision step 402, a decision is made as to whether or not the current value of engine throttle opening (i.e. engine load) is less than or equal to a lower first determinate throttle opening threshold value which corresponds roughly to the idling engine operational condition. If the result of this decision is YES, so that engine throttle opening is indeed less than or equal to said lower first determinate throttle opening threshold value and accordingly the engine 100 of the vehicle is in fact currently idling, then the flow of control passes next to the step 405; but, if on the other hand the result of this decision is NO, so that engine throttle opening is in fact greater than said lower first determinate throttle opening threshold value and accordingly said engine 100 of the vehicle is not currently idling, then the flow of control passes next to the decision step 403.

In this decision step 403, a similar decision is made as to whether or not the current value of engine throttle opening (i.e. engine load) is greater than or equal to a higher second determinate throttle opening threshold value which corresponds roughly to the high load engine operational condition. If the result of this decision is YES, so that engine throttle opening is indeed greater than or equal to said higher second determinate throttle opening threshold value and accordingly the engine 100 of the vehicle is in fact currently operating at high load, then the flow of control passes next to the step 404; but, if on the other hand the result of this decision is NO, so that engine throttle opening is in fact less than said higher second determinate throttle opening threshold value and accordingly said engine 100 of the vehicle is not currently operating at high load and therefore must be operating between idling load and high load, i.e. at an intermediate load, then the flow of control passes next to the decision step 408, thus skipping both of the steps 404 and 405 and further skipping the steps 406 and 407. In other words, in this case that the engine 100 of the vehicle is operating at an intermediate load between idling load and high load, the engaging of the clutch 21 of the central differential device 10 will not be carried out, even if a down shift from the fourth speed stage of the gear transmission mechanism 7 to the first speed stage thereof is being commanded. This is because, when the engine load is at such an intermediate engine load level, there is no need to engage the clutch 21 of the central differential device 10, due to the absence of any abrupt or large increase or decrease in the torque on the output shaft of the transmission mechanism 2.

In the step 404, through which control passes if and only if the throttle opening of the engine 100 is greater than the higher second determinate value therefor, the set time T for a timer, included in the transmission control device 35, is set to a first determinate value $T_1$set, and then the flow of control passes next to the step 406. On the other hand, in the step 405, through which control passes if and only if the throttle opening of the engine 100 is less than or equal to the lower first determinate value therefor, the set time T for said timer is set to a second determinate value $T_2$set, and then again the flow of control passes next to the step 406. The second determinate value $T_2$set is set to be greater than the first determinate value $T_1$set, because, when the throttle opening of the engine 100 is less than or equal to the lower first determinate value therefor, the time required for shifting of the engagement of the four wheel drive power transfer device 3 from the fourth speed stage to the first speed stage is longer, than when the throttle opening of the engine 100 is greater than the higher second determinate value therefor.

In the step 406, similarly to what was done in the first through the third preferred embodiments, the transmission control device 35 outputs a signal to the electric/hydraulic control device 22 to cause said electric/hydraulic control device 22 to engage the clutch 21 of the center differential device 10, so as definitely to rotationally couple together the sun gear 13 and the ring gear 14 of said center differential device 10, and so as therefore to positively prevent said center differential device 10 from performing its differential action between the front vehicle wheels and the rear vehicle wheels, to thus directly drive said front vehicle wheels and said rear vehicle wheels from the engine 100 without any differential action occurring therebetween.

In the step 407, the counting process of the timer is started, and then the flow of control passes next to the step 408.

In the decision step 408, a decision is made as to whether or not the timer is currently running. If the result of this decision is YES, so that the timer is currently running, then the flow of control passes next to the decision step 409; but, if the result of this decision is NO, so that the timer is not currently running, then the flow of control skips to pass next to the step 410.

In the decision step 409, a decision is made as to whether or not the timed value on the timer is greater than the value T therefor set in the step 404 or in the step 405 above. If the result of this decision is YES, so that in fact the timed value on the timer is now greater than said set value T therefor, then the flow of control passes next to the step 410; but, if the result of this decision is NO, so that the timed value on the timer has not yet become greater than said set value T therefor, then the flow of control skips next to exit this program fragment, without doing anything further.

On the other hand, in the step 410, similarly to what was done in the first through the third preferred embodiments, the transmission control device 35 outputs a signal to the electric/hydraulic control device 22 to cause said electric/hydraulic control device 22 not to engage the clutch 21 of the center differential device 10, so as not to rotationally couple together the sun gear 13 and the ring gear 14 of said center differential device 10, so as therefore to allow said center differential device 10 to perform its differential action between the front vehicle wheels and the rear vehicle wheels, to thus drive said front vehicle wheels and said rear vehicle wheels from the engine 1 while distributing rotational power and torque between them with differential action. Then the flow of control passes next to the step 411.

Finally, in this step 411, the timer is stopped, and then the flow of control passes next to exit this program fragment, without doing anything further.

And, as before, by the repetition of the FIG. 5 program in a relatively tight and quick cycle with a period of the order of milliseconds, the control of the electric/hydraulic control device 22 of the four wheel drive power transfer device 3 is maintained.

Thus as described above, in this case only during a down shift of the transmission mechanism 2 from the fourth or highest speed stage thereof to the first or lowest speed stage thereof such as is caused by a manual change of transmission operational range from the "D" range to the "L" range but not during any other down shift, only if the current value of the engine throttle opening is less than said first lesser determinate throttle opening value or is greater than said second greater determinate throttle opening value but not if throttle opening is intermediate between said two determinate throttle opening values, no differential action between the front vehicle wheels and the rear vehicle wheels is performed, and the front and the rear vehicle wheels are at this time directly coupled (as pairs) to the engine 1. Further, the length of the time period for which this impairment of the differential action of the central differential device 10 is maintained, after the issue of the order for shift down, is greater (being T$_2$set) if it was the case that the engine throttle opening was less than said first lesser determinate throttle opening value, than if it was the case that the engine throttle opening was greater than said second greater determinate throttle opening value (which time period was T$_1$set). Since the amount of drive torque distributed to the front vehicle wheels and the rear vehicle wheels thereby becomes even during the shift down period (taken as being T$_1$set or T$_2$set), as opposed to the normal case (for the FIG. 1 gear train) in which the amount of drive torque distributed to the rear vehicle wheels is greater than the amount of drive torque distributed to the front vehicle wheels, thus, in the case of a requirement for sudden vehicle acceleration being the motivation for the vehicle driver to have altered the transmission operational range from the "D" range to the "L" range—which is one possible motivation for such an alteration—the acceleration performance of the vehicle is enhanced, even though the output torque of the transmission mechanism 2 will certainly abruptly become greater following this down shift thereof all the way from its fourth speed stage to its third speed stage, and in this case of rapid acceleration slippage of the rear vehicle wheels on the road surface and consequent poor accleration is mitigated or prevented. On the other hand, in the case of a requirement for high engine braking effect being the motivation for the vehicle driver to have altered the transmission operational range from the "D" range to the "L" range—which is another possible motivation for such an alteration—the engine braking performance of the vehicle is similarly enhanced, even though the output torque of the transmission mechanism 2 will certainly abruptly become greater following this down shift thereof all the way from its fourth speed stage to its third speed stage, and in this case of high engine braking effect again slippage of the rear vehicle wheels on the road surface and consequent poor engine braking effect is again mitigated or prevented.

Figure 6:
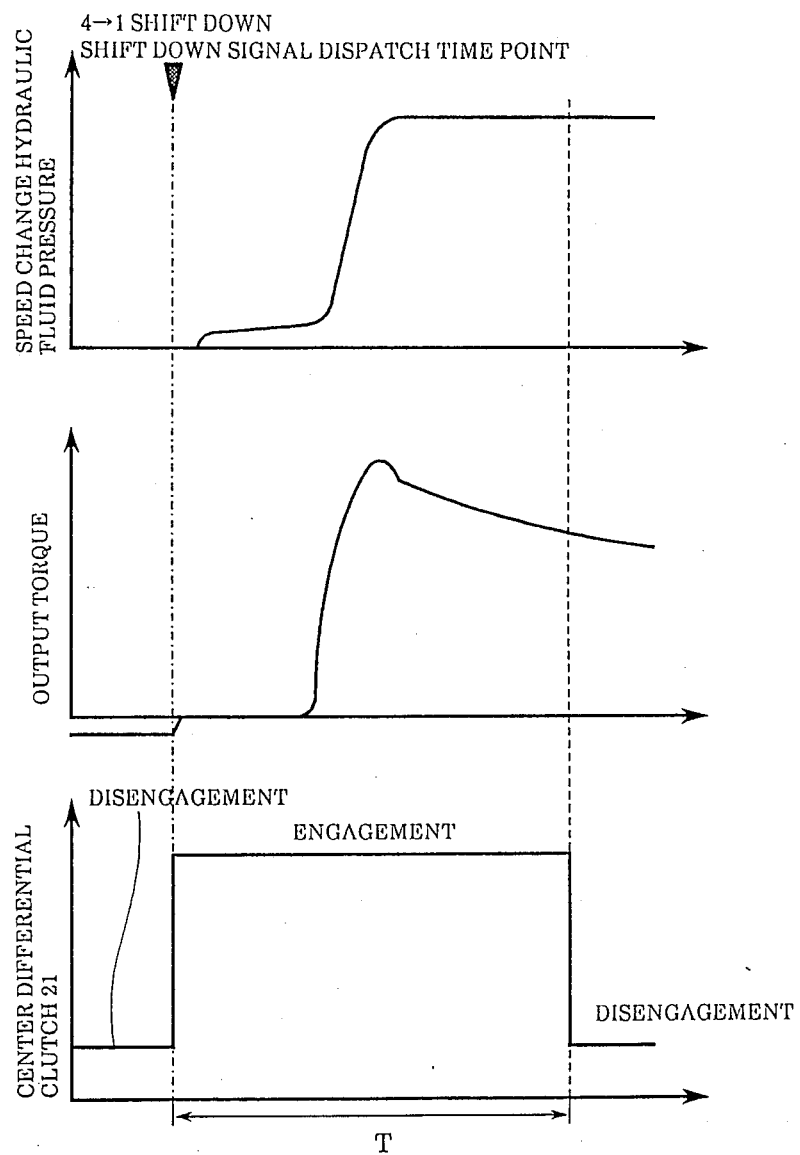
FIG. 6 is a time chart for illustrating the operation of the fourth preferred embodiment slippage control device and method the flow chart relating to which is shown in FIG. 5, during an exemplary episode of transmission down shift during rapid vehicle acceleration.
Figure 7:
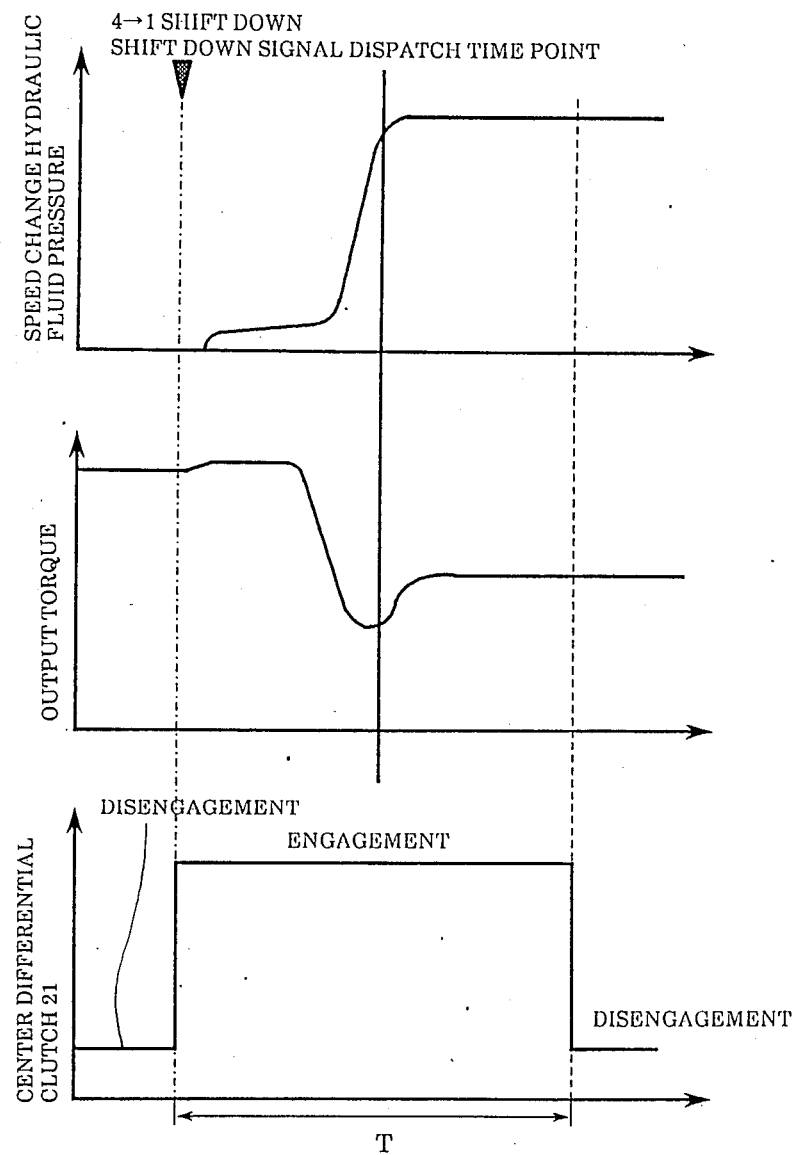
FIG. 7 is a time chart for illustrating the operation of said fourth preferred embodiment slippage control device and method the flow chart relating to which is shown in FIG. 5, during an exemplary episode of transmission down shift during high engine braking conditions.

These control characteristics are illustrated in the time charts of FIGS. 6 and 7. FIG. 6 is a time chart for illustrating an exemplary episode of operation of the slippage control device and method described above with regard to the FIG. 5 flow chart, in the case of rapid desired vehicle acceleration being the motivation for the vehicle driver to alter the transmission operational range from the "D" range to the "L" range; thus, the throttle opening of the engine 1 is greater than the second determinate value therefor during this operational episode. At the time point shown by the dot dashed line in this collection of figures, when the output torque rises abruptly following the down shift, the clutch 21 of the central differential device 10 is engaged, to rotationally connect together the sun gear 13 and the ring gear 14 thereof, thus to cause the four wheel drive power transfer device 3 to cease its differential action between the front vehicle wheels and the rear vehicle wheels, to thus directly drive said front vehicle wheels and said rear vehicle wheels as a slippage control measure. As a result, vehicle acceleration performance is improved. Also, at this point, the timer is started. Next, at the time point shown by the dashed line in this collection of figures, after the time period of the timer has elapsed, the clutch 21 of said four wheel drive power transfer device 3 is now disengaged, so as not to rotationally connect together the sun gear 13 and the ring gear 14 thereof, thus now allowing the four wheel drive power transfer device 3 again to provide its differential action between the front vehicle wheels and the rear vehicle wheels, to thus drive said front vehicle wheels and said rear vehicle wheels while distributing rotational power and torque substantially unequally between them with differential action, in the normal operational mode.

On the other hand, FIG. 7 is a time chart for illustrating an exemplary eposide of operation of the slippage control device and method described above with regard to the FIG. 5 flow chart, in the case of high desired engine braking effect being the motivation for the vehicle driver to alter the transmission operational range from the "D" range to the "L" range; thus, the throttle opening of the engine 1 is less than the first determinate value therefor during this operational episode. At the time point shown by the dot dashed line in this collection of figures, when the output torque changes following the down shift, the clutch 21 of the central differential device 10 is engaged, to rotationally connect together the sun gear 13 and the ring gear 14 thereof, thus to cause the four wheel drive power transfer device 3 to cease its differential action between the front vehicle wheels and the rear vehicle wheels, to thus directly drive said front vehicle wheels and said rear vehicle wheels as a slippage control measure. As a result, vehicle engine braking performance is improved. Also, at this time point, the timer is started. Next, at the time point shown by the dashed line in this collection of figures, after the time period of the timer has elapsed, the clutch 21 of said four wheel drive power transfer device 3 is now disengaged, so as not to rotationally connect together the sun gear 13 and the ring gear 14 thereof, thus now allowing the four wheel drive power transfer device 3 again to provide its differential action between the front vehicle wheels and the rear vehicle wheels, to thus drive said front vehicle wheels and said rear vehicle wheels while distributing rotational power and torque substantially unequally between them with differential action, in the normal operational mode.

CONCLUSION

This slip control method and device utilize the center differential device 8 and the clutch 19 incorporated therein which are already provided to a four wheel drive type transmission, and hence the construction is relatively simple and the provision is economical.

It is acceptable, according to the principle of the present invention, if the clutch 21 or other friction engaging mechanism incorporated in the central differential device 10 is, during times when the differential action of said central differential device 10 is to be prevented or inhibited, be merely partially engaged, rather than being fully engaged as was the case in the preferred embodiments disclosed above. In other words, mere partial inhibition of the action of said central differential device 10, allowing a certain amount of differential action to be provided thereby but somewhat restricting said differential action, may be quite sufficient for providing the advantages of the present invention, in certain circumstances.

As possible modifications to the fourth preferred embodiments of the present invention as disclosed proximately above, in the event that this type of center differential device inhibition action is required during more than one type of down shift of the transmission mechanism 2, the above described timer set value, which in the above could be only set to one or the other of the fixed and determinate values $T_1$set or $T_2$set, may instead be set according to the current values of various operational parameters of the vehicle other than the throttle opening of the engine thereof, such as the type of speed stage change (down shift) that is being performed, or the transmission set operational range, in accordance with the actual amount of time required for each downshift in each set of operational circumstances.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive power transmission system for a vehicle with two front wheels, two rear wheels, a transmission mechanism which has at least two speed stages, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or for its said differential action to be at least partly inhibited:

a slippage control device, comprising:

(a) a means for detecting the occurrence of certain speed shift circumstances of said transmission mechanism; and:

(b) a means for controlling said power distribution device for four wheel drive to at least partly inhibit its differential function, if said speed shift circumstances detection means determines that said transmission mechanism is undergoing said speed shift circumstances.

2. A slippage control device according to claim 1, wherein said means for controlling said power distribution device for four wheel drive is for performing timing control when said transmission mechanism is undergoing said speed shift circumstances in accordance with elapsed time from the time point of outputting of a speed shift command signal to said transmission mechanism.

3. A slippage control device according to claim 2, wherein said means for controlling said power distribution device for four wheel drive is for performing said timing control based upon type of speed shift, in accordance with the actual time required for said speed shift.

4. A slippage control device according to claim 2, wherein said means for controlling said power distribution device for four wheel drive is for performing said timing control based upon load on said vehicle engine, in accordance with the actual time required for said speed shift.

5. A slippage control device according to claim 2, said transmission mechanism being an automatic type transmission mechanism which is controlled automatically according to a plurality of manually set operational ranges, wherein said means for controlling said power distribution device for four wheel drive is for performing said timing control based upon manually set operating range for said transmission mechanism, in accordance with the actual time required for said speed shift.

6. A slippage control device according to claim 1, wherein said speed shift circumstances are speed down shift circumstances.

7. A slippage control device according to claim 1, wherein said speed shift circumstances are circumstances of speed down shift to the first speed stage of said transmission mechanism.

8. A slippage control device according to claim 1, said transmission mechanism being an automatic type transmission mechanism which is controlled automatically according to a plurality of manually set operational ranges, wherein said speed shift circumstances are speed down shift circumstances which accompany a manual change of operational range of said transmission mechanism.

9. A slippage control device according to claim 8, wherein said manual change of operational range of said transmission mechanism is a change from "D" range to "L" range.

10. A slippage control device according to claim 1, wherein said speed shift circumstances are circumstances of speed shift when vehicle road speed is higher than a determinate value.

11. A slippage control device according to claim 1, wherein said speed shift circumstances are circumstances of shift when vehicle turning angle is higher than a determinate value.

12. A slippage control device according to claim 1, wherein said speed shift circumstances are circumstances of speed shift when vehicle road speed is higher than a determinate value and also vehicle turning angle is higher than a determinate value.

13. A slippage control device according to any of claims 1 through 12, said power distribution device for four wheel drive, when thus being controlled to provide differential action, distributing drive torque substantially unequally between said combination of said front wheels of said vehicle and said combination of said rear wheels of said vehicle.

14. For a four wheel drive power transmission system for a vehicle with two front wheels, two rear wheels, a transmission mechanism which has at least two speed stages, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive being controllable either to provide differential action between said combination of said front wheels of said vehicle and said combination of said rear wheels of said vehicle, or for its said differential action to be at least partly inhibited:
a slippage control method, wherein:
(a) the occurrence of certain speed shift circumstances of said transmission mechanism is detected; and:
(d) said power distribution device for four wheel drive is controlled to at least partly inhibit its differential function, if said speed shift circumstances detection has determined that said transmission mechanism is undergoing said speed shift circumstances.

15. A slippage control method according to claim 14, wherein said power distribution device for four wheel drive is controlled by timing control when said transmission mechanism is undergoing said speed shift circumstances in accordance with elapsed time from the time point of outputting of a speed shift command signal to said transmission mechanism.

16. A slippage control method according to claim 15, wherein said power distribution device for four wheel drive is controlled by said timing control based upon type of speed shift, in accordance with the actual time required for said speed shift.

17. A slippage control method according to claim 15, wherein said power distribution device for four wheel drive is controlled by said timing control based upon load on said vehicle engine, in accordance with the actual time required for said speed shift.

18. A slippage control method according to claim 15, said transmission mechanism being an automatic type transmission mechansim which is controlled automatically according to a plurality of manually set operational ranges, wherein said power distribution device for four wheel drive is controlled by said timing control based upon manually set operating range for said transmission mechanism, in accordance with the actual time required for said speed shift.

19. A slippage control method according to claim 14, wherein said speed shift circumstances are speed down shift circumstances.

20. A slippage control method according to claim 14, wherein said speed shift circumstances are circumstances of speed down shift to the first speed stage of said transmission mechanism.

21. A slippage control method according to claim 14, said transmission mechanism being an automatic type transmission mechanism which is controlled automatically according to a plurality of manually set operational ranges, wherein said speed shift circumstances are speed down shift circumstances which accompany a manual change of operational range of said transmission mechanism.

22. A slippage control method according to claim 21, wherein said manual change of operational range of said transmission mechanism is a change from "D" range to "L" range.

23. A slippage control method according to claim 14, wherein said speed shift circumstances are circumstances of speed shift when vehicle road speed is higher than a determinate value.

24. A slippage control method according to claim 14, wherein said speed shift circumstances are circumstances of speed shift when vehicle turning angle is higher than a determinate value.

25. A slippage control method according to claim 14, wherein said speed shift circumstances are circumstances of speed shift when vehicle road speed is higher than a determinate value and also vehicle turning angle is higher than a determinate value.

26. A slippage control method according to any one of claims 14 through 25, said power distribution device for four wheel drive, when thus being controlled to provide differential action, distributing drive torque substantially unequally between said combination of said front wheels of said vehicle and said combination of said rear wheels of said vehicle.

* * * * *